United States Patent
Hagita et al.

(10) Patent No.: US 11,725,593 B2
(45) Date of Patent: Aug. 15, 2023

(54) GAS TURBINE AND METHOD FOR ADJUSTING FLOW RATE OF FUEL SUPPLIED THERETO

(71) Applicant: Mitsubishi Heavy Industries, Ltd., Tokyo (JP)

(72) Inventors: Tatsuya Hagita, Yokohama (JP); Keita Naito, Yokohama (JP); Mitsuhiro Karishuku, Yokohama (JP); Masaya Kato, Yokohama (JP); Satoshi Tanimura, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 39 days.

(21) Appl. No.: 17/477,167

(22) Filed: Sep. 16, 2021

(65) Prior Publication Data
US 2022/0099033 A1 Mar. 31, 2022

(30) Foreign Application Priority Data
Sep. 28, 2020 (JP) .................. 2020-161906

(51) Int. Cl.
*F02C 9/00* (2006.01)
*F02C 9/26* (2006.01)

(52) U.S. Cl.
CPC .......... *F02C 9/263* (2013.01); *F05D 2220/32* (2013.01)

(58) Field of Classification Search
CPC ...................................... F02C 9/263
See application file for complete search history.

(56) References Cited

U.S. PATENT DOCUMENTS

| | | | | |
|---|---|---|---|---|
| 2007/0089395 A1* | 4/2007 | Fujii | .................. | F02C 9/28 60/39.281 |
| 2010/0287945 A1* | 11/2010 | Liedtke | .................. | F02C 3/22 60/773 |
| 2015/0354466 A1* | 12/2015 | Higashi | .................. | F02C 9/263 60/776 |
| 2017/0248083 A1* | 8/2017 | Fetvedt | .................. | F02C 3/34 |

(Continued)

FOREIGN PATENT DOCUMENTS

| | | |
|---|---|---|
| JP | 2011-252686 A | 12/2011 |
| JP | 2011-256788 A | 12/2011 |

OTHER PUBLICATIONS

Japanese-language Office Action issued in Japanese Application No. 2020-161906 dated Jan. 31, 2023 with English translation (five (5) pages).

*Primary Examiner* — Katheryn A Malatek
(74) *Attorney, Agent, or Firm* — Crowell & Moring LLP

(57) ABSTRACT

A gas turbine including a fuel gas supply system to supply fuel gas via a fuel piping to a gas turbine combustor, a pressure control valve installed halfway along the fuel piping, a flow control valve installed in the fuel piping at downstream of the pressure control valve, and a control device configured that in a case where a flow rate change occurs in the fuel gas flowing through the fuel gas supply system, along with a tendency of change in an opening degree of the pressure control valve or a pressure P1 at upstream of the pressure control valve, a command value of the flow rate of the fuel gas that is determined based on a demand value of a gas turbine load is adjusted so that the change is suppressed in the opening degree of the pressure control valve or the pressure P1.

14 Claims, 5 Drawing Sheets

(56) References Cited

U.S. PATENT DOCUMENTS

| | | | |
|---|---|---|---|
| 2017/0292457 A1* | 10/2017 | Selstad | F02C 9/44 |
| 2020/0141321 A1* | 5/2020 | Quartieri | B64D 37/32 |
| 2020/0200098 A1* | 6/2020 | Carpenter | F02C 9/266 |
| 2020/0300181 A1* | 9/2020 | Miyamoto | F02C 7/228 |

* cited by examiner

GAS TURBINE AND METHOD FOR ADJUSTING FLOW RATE OF FUEL SUPPLIED THERETO

CLAIM OF PRIORITY

The present application claims priority from Japanese Patent application serial No. 2020-161906, filed on Sep. 28, 2020, the content of which is hereby incorporated by reference into this application.

BACKGROUND OF THE INVENTION

The present invention pertains to a gas turbine and a method for adjusting the flow rate of fuel supplied thereto. The present invention particularly relates to a gas turbine and a method for adjusting the flow rate of fuel supplied thereto, favorably suited for adjusting the flow rate of fuel in response to variation in the composition, fuel temperature, etc. of fuel gas that is supplied from fuel supply equipment to a gas turbine combustor.

As a prior art literature concerning adjustment of the flow rate of fuel gas to a gas turbine, reference can be made to Japanese Unexamined Patent Application Publication No. 2011-256788.

In Japanese Unexamined Patent Application Publication No. 2011-256788, a gas turbine implementation is described with the aim of obtaining a gas turbine that is made capable of continuous operation according to fuel supply pressure and whose operation can be controlled effectively for improving its operability with reduced tripping times. The gas turbine operation is controlled by a control system portion that calculates and outputs an opening degree command of a flow control valve placed in a gas fuel supply system to supply fuel gas to the combustor. Under control of the control system portion, after fuel gas supplied at a predetermined fuel supply pressure from a fuel tank is adjusted to a setting value of fuel supply pressure by a pressure control valve, the fuel gas is adjusted to a desired fuel gas flow rate by the flow control valve and supplied to the combustor. The control system portion includes a unit that computes a gas turbine output command. This unit determines a gas turbine output setting value according to fuel supply pressure based on an operation map which has been set beforehand. A selection is made of a minimum value of multiple gas turbine output command values including the gas turbine output setting value, and an opening degree command is determined.

SUMMARY OF THE INVENTION

By the way, as regards the gas supply system to supply fuel gas from the fuel supply equipment to the gas turbine combustor, fuel gas may be extracted for use by other equipment and returned at upstream of the fuel gas supply system when the gas turbine is operating.

When fuel gas is extracted and returned at upstream of the fuel gas supply system, it is required to adapt a gas turbine load command according to the flow rate of fuel gas that is supplied to the gas turbine.

Specifically, when the composition and fuel temperature of extracted and returned fuel gas change relative to the composition and fuel temperature of fuel gas supplied from the fuel supply equipment, resulting in change in the composition and fuel temperature of fuel gas that is supplied to the gas turbine (after being merged with returned fuel gas), or when the composition and fuel temperature of fuel gas supplied from the fuel supply equipment change over time for some reason, change occurs in the calorific value and density of fuel gas that is supplied to the gas turbine.

Along with this change, volume consumption of fuel gas in response to a gas turbine load command changes inside the gas turbine. Unless a load command value suitable for the volumetric flow rate of fuel gas supplied to the gas turbine is given, shortage or stagnation of fuel gas flowing through the piping of the fuel gas supply system would take place. There may occur a pressure drop or excessive pressure at upstream of the pressure control valve installed in the fuel gas supply system and this may cause shutdown (tripping) of a plant with the gas turbine.

However, in the gas turbine implementation described in Japanese Unexamined Patent Application Publication No. 2011-256788 mentioned above, no consideration is taken for a problem discussed above.

The present invention has been developed in view of the foregoing issue and an object of the present invention is to provide a gas turbine and a method for adjusting the flow rate of fuel supplied thereto, enabling stable gas turbine operation, avoiding a situation where the gas turbine fails to continue its operation due to a pressure drop or excessive pressure occurring in the upstream side of the fuel gas supply system.

To achieve the foregoing object, one aspect of the present invention resides in a gas turbine including a fuel gas supply system configured to supply fuel gas from a fuel supply equipment via a fuel piping to a gas turbine combustor, a pressure control valve installed halfway along the fuel piping to control pressure of the fuel gas, a flow control valve installed in the fuel piping at a downstream side of the pressure control valve to control a flow rate of the fuel gas, and a control device configured that in a case where a flow rate change occurs in the fuel gas flowing through the fuel gas supply system, along with a tendency of change in an opening degree of the pressure control valve or a pressure P1 at an upstream side of the pressure control valve, a command value of the flow rate of the fuel gas that is determined based on a demand value of a gas turbine load is adjusted so that the change is suppressed in the opening degree of the pressure control valve or the pressure P1 at the upstream side of the pressure control valve.

To achieve the foregoing object, another aspect of the present invention resides in a method for adjusting a flow rate of fuel to a gas turbine, the gas turbine provided with a fuel gas supply system configured to supply fuel gas from a fuel supply equipment via a fuel piping to a gas turbine combustor, a pressure control valve installed halfway along the fuel piping to control pressure of the fuel gas, and a flow control valve installed in the fuel piping at a downstream side of the pressure control valve to control a flow rate of the fuel gas, wherein, for adjusting the flow rate of the fuel gas supplied to the gas turbine in a case where a flow rate change occurs in the fuel gas flowing through the fuel gas supply system, along with a tendency of change in an opening degree of the pressure control valve or a pressure P1 at an upstream side of the pressure control valve, the method adjusts a command value of the flow rate of the fuel gas that is determined based on a demand value of a gas turbine load so that the change is suppressed in the opening degree of the pressure control valve or the pressure P1 at the upstream side of the pressure control valve.

According to the present invention, stable gas turbine operation is enabled, avoiding a situation where the gas turbine fails to continue its operation due to a pressure drop or excessive pressure occurring in the upstream side of the fuel gas supply system.

DETAILED DESCRIPTION OF THE PREFERRED EMBODIMENTS

Figure 1:
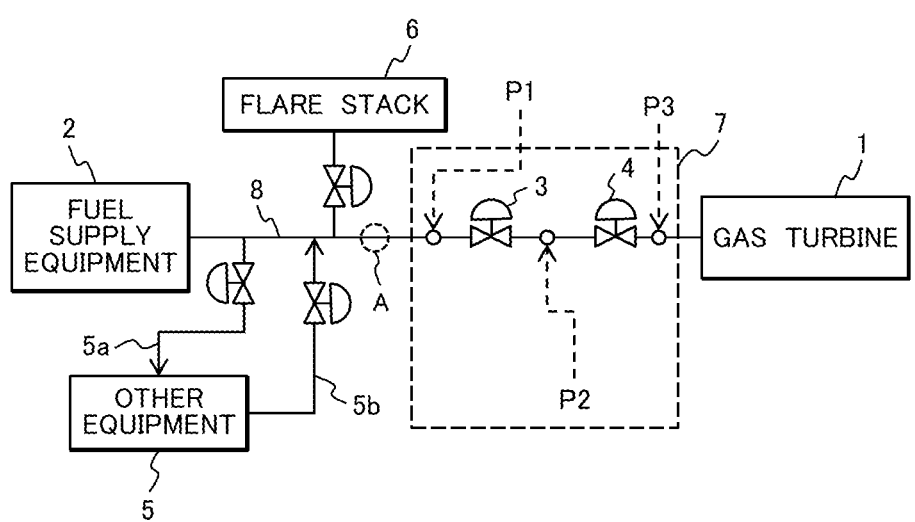
FIG. 1 is a diagram depicting one example of a fuel gas supply system for the gas turbine to supply fuel gas from fuel supply equipment to a first embodiment of the gas turbine of the present invention.

In the following, descriptions are provided for a gas turbine and a method for adjusting the flow rate of fuel supplied thereto according to the present invention, based on illustrated embodiments. Note that identical reference numerals or designators are used to denote identical components in the drawings.

First Embodiment

FIGS. 1, 2, 3, and 4 depict a first embodiment of the gas turbine 1 of the present invention.

Figure 2:
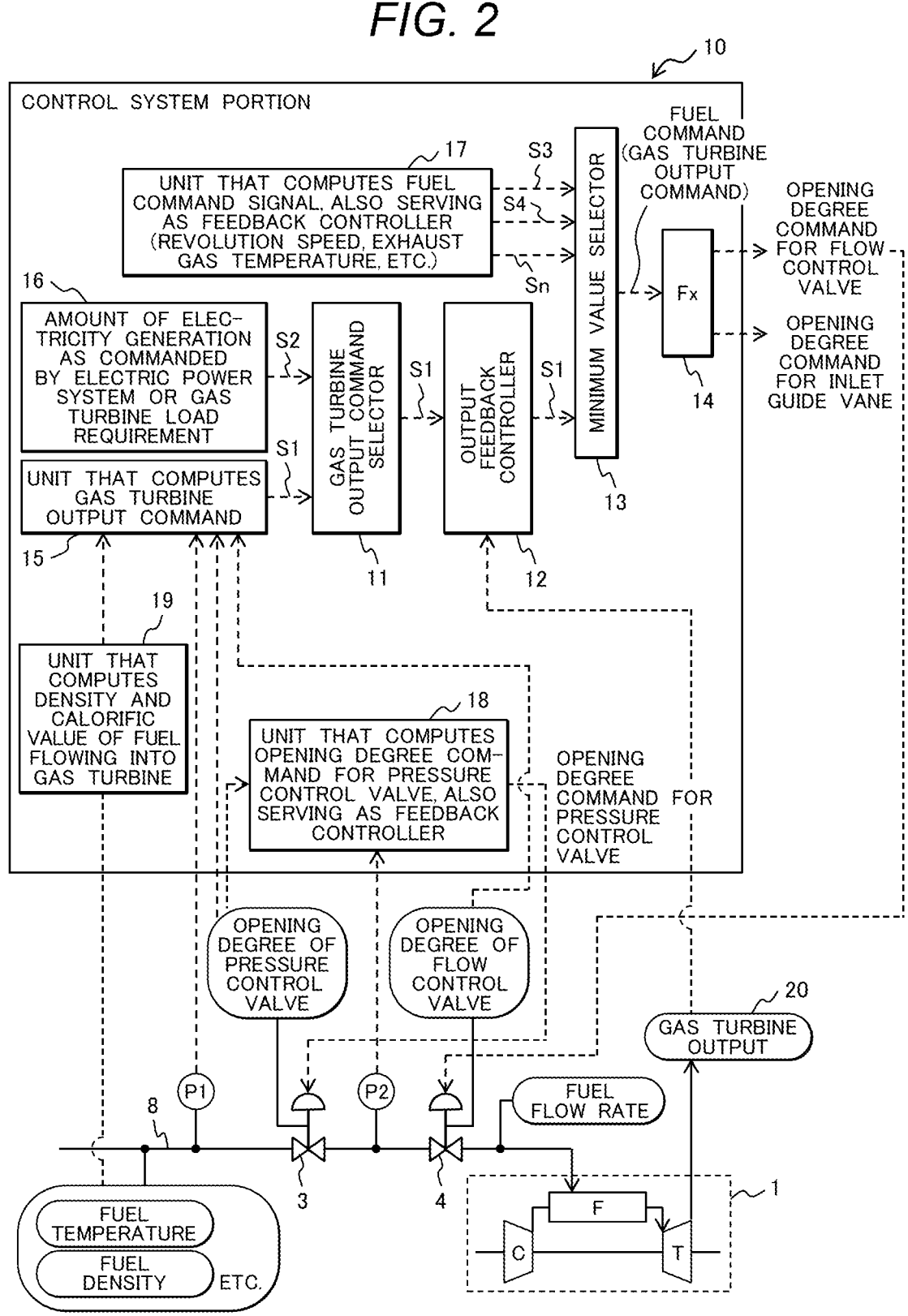
FIG. 2 is a diagram depicting details of a control system for the fuel gas supply system for the gas turbine depicted in FIG. 1.
Figure 3:
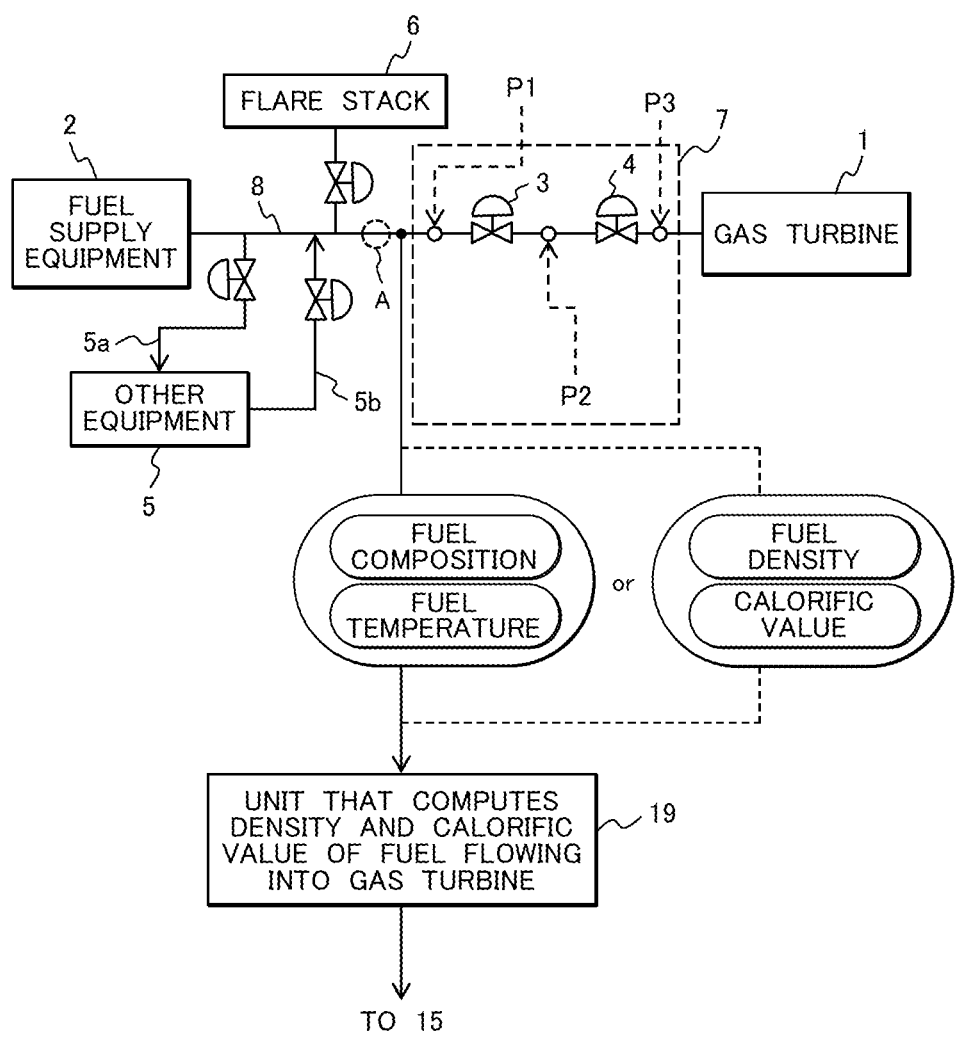
FIG. 3 is a diagram illustrating an example in which measurements are taken of, inter alia, the composition, temperature, flow rate, density, and calorific value of fuel gas from the fuel piping of the fuel gas supply system for the gas turbine depicted in FIG. 1.
Figure 4:
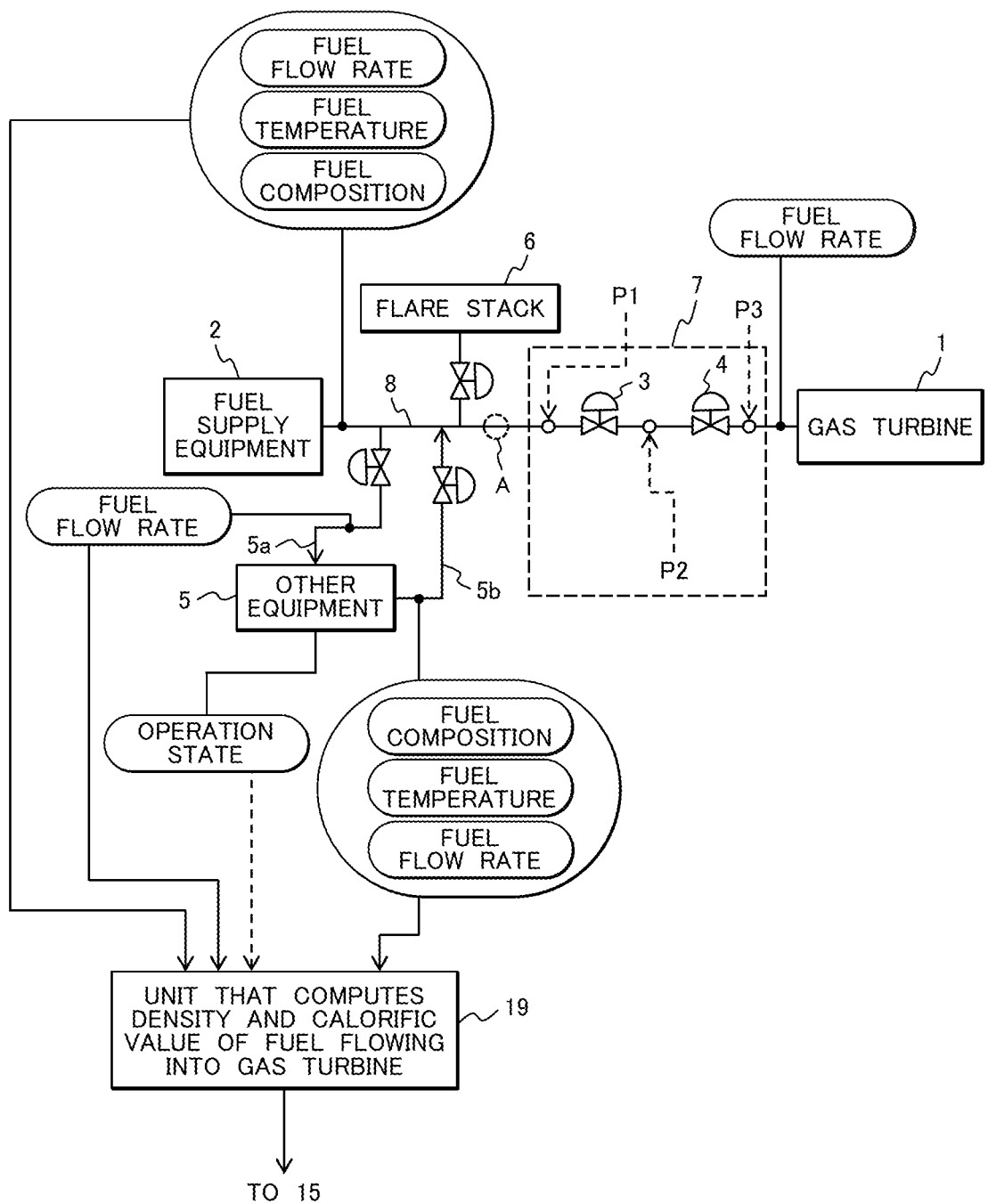
FIG. 4 is a diagram illustrating an example in which measurements are taken of the flow rate, temperature, and composition of fuel gas flowing through the fuel piping of the fuel gas supply system for the gas turbine depicted in FIG. 1 before being extracted to other equipment, the flow rate of fuel gas flowing through a fuel gas extraction line to the other equipment, and the composition, temperature, flow rate, etc. of fuel gas flowing through a fuel gas return line from the other equipment.

FIG. 1 depicts one example of a fuel gas supply system 7 for the gas turbine 1 to supply fuel gas from fuel supply equipment 2 to the first embodiment of the gas turbine 1 of the present invention. FIGS. 2, 3, and 4 depict details of a control system for the fuel gas supply system 7.

As depicted in the relevant figure, the gas turbine 1 of the present embodiment is comprised of a compressor C, a combustor F, and a turbine T. A pressure control valve 3 and a flow control valve 4 are installed in fuel piping 8 to supply fuel gas, such as natural gas (LNG), from the fuel supply equipment 2, such as a fuel tank, to the gas turbine.

The pressure control valve 3 is a control value for adjusting fuel gas supplied at a constant fuel supply pressure from the fuel supply equipment 2 to desired pressure. For this pressure control valve 3, its opening degree is always regulated so that its adjusted outlet pressure to be detected downstream of it is kept at desired pressure.

The flow control valve 4 is a control valve that adjusts the flow rate of fuel gas supplied at desired pressure to a desired value.

In such a configuration, fuel gas to be supplied to the gas turbine 1 is supplied from the fuel supply equipment 2 via the pressure control valve 3 and the flow control valve 4 to the gas turbine 1. In this supply process, for fuel gas supplied from the fuel supply equipment 2, its pressure is adjusted by the pressure control valve 3 to constant pressure and then the flow rate of the fuel gas flowing into the gas turbine 1 is controlled by the flow control valve 4 at downstream of the pressure control valve 3.

Note that, in the present embodiment, pressure at upstream of the pressure control valve 3 is defined as P1 pressure or pressure P1, pressure at downstream of the pressure control valve 3 as P2 pressure or pressure P2, and pressure at downstream of the flow control valve 4 as P3 pressure or pressure P3.

In addition, in a configuration example of the gas turbine 1, one gas turbine 1 includes multiple combustors F and each combustor F is equipped with multiple main fuel nozzles and one or more pilot fuel nozzles.

As depicted in FIG. 2, the gas turbine 1 is a device comprised principally of the compressor C, the combustor F, and the turbine T. The compressor C takes in and compresses air and discharges the air compressed at high pressure. The compressed air discharged from the compressor C is brought into the combustor F as combustion air. The gas turbine fuel supplied to the combustor F is combusted with the air to generate high temperature combustion gas. This combustion gas is brought into the turbine T and circulates between the rotor and stator vanes to drive the turbine T and output is gained.

An output shaft of the gas turbine 1 is coupled to, e.g., a generator which is not depicted, thereby driving the generator to generate electricity. Alternately, for a mechanical drive application, the gas turbine output shaft is coupled to a compressor in an LNG plant to drive the compressor.

Furthermore, in the gas turbine 1 of the present embodiment, as depicted in FIG. 1, a fuel gas extraction line 5*a* to other equipment 5 and a fuel gas return line 5*b* from the other equipment 5 are connected to upstream of the fuel gas supply system 7 that supplies fuel gas from the fuel supply equipment 2 to the gas turbine 1. For usage of fuel gas in the other equipment 5 during operation of the gas turbine 1, extraction and return of fuel gas may be performed via the fuel gas extraction line 5*a* to the other equipment 5 and the fuel gas return line 5*b* from the other equipment 5 at upstream of the fuel gas supply system 7.

As the other equipment 5, e.g., a fuel gas reformer or the like is conceivable and can be supposed to be used in ways described below.

Specifically, (a) it is conceivable to reform fuel gas for another application usage in a plant, supply the fuel gas within the plant, and return surplus gas to the gas turbine 1, as needed. Additionally, for instance, (b) it is conceivable to reform fuel gas to be supplied to the gas turbine 1 to the gas having a composition suitable for fuel. In particular, by removing inactive ingredients or the like included in fuel and adjusting its calorific value, fuel gas is reformed to the gas having a composition within a design range of the gas turbine 1; this enables the use of fuel gas with a wide range of compositions. Additionally, (c) it is also possible to remove carbon content in combustion process for the purpose of reducing greenhouse gas.

The flow rate of fuel gas to be supplied to the gas turbine 1 may, for example, be controlled in such a way to control it to meet a required load of the gas turbine 1. In particular, a command value of the fuel gas flow rate is determined based on a value required by the load of the gas turbine 1 and the opening degree of the flow control valve 4 is set according to the command value, so that fuel gas flows at a specified flow rate.

In this process, if the generated output of the gas turbine 1 does not fulfill the initial load requirement of the gas turbine 1, the command value of the fuel gas flow rate is adjusted by feedback control, so that the required load of the gas turbine 1 is attained eventually.

In the present embodiment illustrated in FIG. 1, the amount of fuel gas extracted through the fuel gas extraction line 5a to the other equipment 5, the flow rate of gas returned through the fuel gas return line 5b from the other equipment 5, and the composition and temperature of such fuel gas may be determined subject to operation of the other equipment 5. Also, the amount of fuel that is supplied from the fuel supply equipment 2 and the composition and temperature of such fuel gas may be subject to change.

In a system where there is variation in the amount of fuel extracted through the fuel gas extraction line 5a to the other equipment 5, the flow rate of gas returned through the fuel gas return line 5b from the other equipment 5, or the amount of fuel gas that is supplied from the fuel supply equipment 2, if there is an unbalance between the flow rate of fuel gas that is consumed by the gas turbine 1 and the flow rate of fuel gas that is supplied to the gas turbine 1 (e.g., the flow rate at downstream of a confluence at which the fuel gas return line 5b from the other equipment 5 joins up with the main supply line (at a location A in FIG. 1)), this situation causes a pressure drop at the location A due to shortage of fuel gas flowing through the fuel piping 8 of the fuel gas supply system 7 in the vicinity of the location A or a pressure rise at the location A due to an excessive flow rate of the fuel gas; eventually, this may result in a situation where it is difficult to maintain continuous operation of the gas turbine 1.

Specifically, regarding the fuel gas supply pressure (P2 pressure and P1 pressure at upstream), because fuel gas is supplied via a fuel nozzle of the combustor F into a combustion chamber which is the destination of supply in the gas turbine 1, the fuel gas supply pressure needs to be set to a value taking account of pressure loss by the fuel nozzle and pressure loss in the fuel gas supply system 7 along with the internal pressure of the gas turbine 1.

Hence, for instance, if fuel gas shortage occurs at the location A in FIG. 1 and the P1 pressure drops and, moreover, the P2 pressure at downstream of the pressure control valve 3 also fails to be maintained at a specified value, the required flow rate cannot be ensured even if the flow control valve 4 is fully opened, and the fuel gas flow rate and even the gas turbine 1 may become uncontrollable.

In order to properly control pressure within the fuel gas supply system 7 for the gas turbine 1, in a case where change occurs in the flow rate of fuel gas flowing through the fuel gas supply system 7, along with a tendency of change in the opening degree of the pressure control valve 3 or pressure (P1 pressure) at upstream of the pressure control valve 3, the present embodiment adjusts a command value of the fuel gas flow rate that is determined based on a value required by the load of the gas turbine 1 so that no change occurs in the opening degree of the pressure control valve 3 or the pressure (P1 pressure) at upstream of the pressure control valve 3. Thereby, the embodiment adjusts the flow rate of the fuel gas flowing into the gas turbine 1 and prevents that the fuel gas pressure within the fuel gas supply system 7 for the gas turbine 1 becomes unbalanced and the gas turbine 1 fails to continue its operation.

The gas turbine 1 of the present embodiment as above is provided with a control system portion (control device) 10 that calculates and outputs an opening degree command for the pressure control valve 3 and the flow control valve 4 installed in the fuel gas supply system 7 through which fuel gas is supplied to the combustor F. In a case where change occurs in the flow rate of fuel gas flowing through the fuel gas supply system 7, along with a tendency of change in the opening degree of the pressure control valve 3 or the pressure (P1 pressure) at upstream of the pressure control valve 3, this control system portion 10 adjusts a command value of the fuel gas flow rate that is determined based on a value required by the load of the gas turbine 1 so that no change occurs in the opening degree of the pressure control valve 3 or the pressure (P1 pressure) at upstream of the pressure control valve 3. Thereby, after adjusting the flow rate of fuel gas flowing into the gas turbine 1, the control system portion implements operation control so that the flow control valve 4 adjusts the fuel gas flow to a desired flow rate and supply the fuel gas to the combustor F.

The control system portion 10 of the present embodiment includes a unit 19 that computes the density and calorific value of fuel flowing into the gas turbine (see FIG. 3). This unit takes input of, inter alia, the composition, temperature, density, and calorific value of fuel gas measured in the vicinity of the P1 pressure (the location A in FIG. 1) along the fuel piping 8 of the fuel gas supply system 7 and computes, inter alia, the calorific value and density of fuel flowing into the gas turbine 1. Results of computing by the unit 19 that computes the density and calorific value of fuel flowing into the gas turbine are input to a unit 15 that computes a gas turbine output command. Note that the unit 15 that computes a gas turbine output command also takes input of the P1 pressure and opening degree information of the pressure control valve 3 and the flow control valve 4.

The control system portion 10 of the present embodiment also includes a unit 18 that computes an opening degree command for the pressure control valve, also serving as a feedback controller. This unit takes input of the P2 pressure and opening degree information of the pressure control valve 3, computes an opening degree command toward the pressure control valve 3, and performs feedback control. An opening degree command is output to the pressure control valve 3 from the unit 18 that computes an opening degree command for the pressure control valve, also serving as a feedback controller.

Note that, although an example illustrated in FIG. 3 assumes that measurements are taken of, inter alia, the composition, temperature, density, and calorific value of fuel gas in the vicinity of the P1 pressure (the location A in FIG. 1) along the fuel piping 8 of the fuel gas supply system 7, if the measurements cannot be taken in the vicinity of the P1 pressure (the location A in FIG. 1) along the fuel piping 8 of the fuel gas supply system 7, the flow rate, temperature, and composition of fuel gas flowing through the fuel piping 8 before being extracted to the other equipment 5, the flow rate of fuel gas flowing through the fuel gas extraction line 5a to the other equipment 5, and the composition, temperature, and flow rate of fuel gas flowing through the fuel gas return line 5b from the other equipment 5 may be input to the unit 19 that computes the density and calorific value of fuel flowing into the gas turbine, as illustrated in FIG. 4.

The control system portion 10 of the present invention also includes the unit 15 that computes a gas turbine output command. This unit takes input of results of computing by the unit 19 that computes the density and calorific value of fuel flowing into the gas turbine, the P1 pressure, and opening degree information of the pressure control valve 3 and the flow control valve 4. From among a plurality of (n pieces of) gas turbine output command values S1 to Sn including a gas turbine output setting value S1 output from the unit 15 that computes a gas turbine output command, a minimum value is selected by a minimum value selector 13 and an opening degree command is determined. In this regard, in addition to the gas turbine output command value S1, there are values as follows: a gas turbine output command value S2 which is output from an amount of electricity generation as commanded by an electric power system or gas turbine load requirement 16 requested from the plant; and gas turbine output command values S3 to Sn which are output from a unit 17 that computes a fuel command signal, also serving as a feedback controller, based on revolution speed of the gas turbine 1 and exhaust gas temperature among others.

The gas turbine output command values S1 and S2 mentioned above are input to a gas turbine output command selector 11.

The gas turbine output command selector 11 selects an output command value which is one of the gas turbine output command values S1 and S2 and outputs it to an output feedback controller 12. In a case where change occurs in the flow rate of fuel gas flowing through the fuel gas supply system 7, along with a tendency of change in the opening degree of the pressure control valve 3 or pressure (P1 pressure) at upstream of the pressure control valve 3, the gas turbine output command selector 11 preferentially selects the gas turbine output command value S1 output from the unit 15 that computes a gas turbine output command with priority over the gas turbine output command value S2 based on an amount of electricity generation as commanded by an electric power system or gas turbine load requirement 16.

In other words, in a case where change occurs in the flow rate of fuel gas flowing through the fuel gas supply system 7, along with a tendency of change in the opening degree of the pressure control valve 3 or pressure (P1 pressure) at upstream of the pressure control valve 3, the gas turbine output command selector 11 in the present embodiment selects the gas turbine output command value S1 to carry out operation that prioritizes the actual condition of the gas turbine 1 over a request by the electric power system.

The thus selected gas turbine output command value S1 is input to the output feedback controller 12 that receives input of a gas turbine output 20. Then, it is input to the minimum value selector 13 as a gas turbine output command value S1' subjected to feedback control through comparison with the current gas turbine output 20.

To the minimum value selector 13, in addition to the gas turbine output command value S1', the gas turbine output command values S3 to Sn are also input output from the abovementioned unit 17 that computes a fuel command signal, also serving as a feedback controller.

The minimum value selector 13 makes a comparison among all the gas turbine output command values S1' and S3 to Sn input to it and inputs the minimum one of those values to a function processor 14 as a fuel command (a gas turbine output command). In a case where change occurs in the flow rate of fuel gas flowing through the fuel gas supply system 7, along with a tendency of change in the opening degree of the pressure control valve 3 or pressure (P1 pressure) at upstream of the pressure control valve 3, the gas turbine output command value S1' is selected as the fuel command.

The function processor 14 arithmetically processes the input fuel command based on a function Fx and outputs an opening degree command signal for the flow control valve 4 and an opening degree command signal for an inlet guide vane (IGV).

Operation control of the gas turbine 1 is implemented as described in the foregoing context. The control system portion 10 includes the unit 19 that computes the density and calorific value of fuel flowing into the gas turbine. This unit takes input of, inter alia, the composition, temperature, density, and calorific value of fuel gas measured in the vicinity of the P1 pressure (the location A in FIG. 1) along the fuel piping 8 of the fuel gas supply system 7 and computes, inter alia, the calorific value and density of fuel flowing into the gas turbine 1. Results of computing by the unit 19 that computes the density and calorific value of fuel flowing into the gas turbine are input to the unit 15 that computes a gas turbine output command. The control system portion 10 further includes the unit 18 that computes an opening degree command for the pressure control valve, also serving as a feedback controller. This unit takes input of the P2 pressure and opening degree information of the pressure control valve 3, computes an opening degree command toward the pressure control valve 3, and performs feedback control. An opening degree command is output to the pressure control valve 3 from the unit 18 that computes an opening degree command for the pressure control valve, also serving as a feedback controller. Accordingly, in a case where change occurs in the flow rate of fuel gas flowing through the fuel gas supply system 7, along with a tendency of change in the opening degree of the pressure control valve 3 or pressure (P1 pressure) at upstream of the pressure control valve 3, it is possible to adjust a command value of the fuel gas flow rate that is determined based on a value required by the load of the gas turbine 1 so that no change occurs in the opening degree of the pressure control valve 3 or the pressure (P1 pressure) at upstream of the pressure control valve 3. Stable operation of the gas turbine is enabled, avoiding a situation where the gas turbine fails to continue its operation due to a pressure drop or excessive pressure occurring in the upstream side of the fuel gas supply system.

Then, descriptions are provided about a method for adjusting the flow rate of fuel to the gas turbine according to the present embodiment.

In the present embodiment, an adjustment is made of a command value of the flow rate of fuel gas to the gas turbine 1 to maintain the P1 pressure at a constant value, according to procedural steps 1 and 2 below.

Through this, it is possible to control the flow rate of fuel gas flowing in and out of the fuel gas supply system for the gas turbine 1 in a balanced state.

Step 1: Set the opening degree of the pressure control valve 3 in a state where it is automatically controlled by the unit 18 that computes an opening degree command for the pressure control valve, also serving as a feedback controller, so that the P2 pressure reaches its target value. In this process, the opening degree of the pressure control valve 3 is automatically determined from the volumetric flow rate of fuel gas and the initial value of the P1 pressure.

Step 2: In a state where the P2 pressure is controlled to be maintained at a constant value as the result of step 1 above, when change occurs in the flow rate or calorific value of fuel gas supplied to the fuel gas supply system 7 for the gas turbine 1 due to operation of the other equipment 5 or the fuel gas supply equipment 2, resulting in a tendency of change in the P1 pressure, namely, when the P1 pressure increases or decreases over time, adjust a command value of the flow rate of fuel gas to the gas turbine 1 so that no change occurs in the P1 pressure.

In particular, the command value of the fuel gas flow rate should be decreased if the P1 pressure decreases or increased if the P1 pressure increases.

According to the present embodiment, stable operation of the gas turbine 1 is enabled, avoiding a situation where the gas turbine fails to continue its operation due to deficiency or excess of the internal pressure of the fuel piping 8 of the fuel gas supply system 7 in the upstream side of the pressure control valve 3.

In addition, almost all of fuel gas that is supplied to the upstream side of the gas turbine 1 can be supplied to the gas turbine 1 without being routed to a flare stack 6 and disposed of. Gas turbine operation without reducing plant efficiency is achievable.

In the present embodiment, it is conceivable that the temperature of fuel gas is measured at upstream of the pressure control valve 3. It is also conceivable that the density and calorific value of fuel gas are directly measured at upstream of the pressure control valve 3 or calculated from the measurements of the composition and temperature of fuel gas measured at upstream of the pressure control valve 3. Moreover, it is conceivable to calculate the composition and temperature of mixed fuel gas and calculate the density and calorific value of fuel gas flowing into the gas turbine 1, based on the gas composition and the temperature and flow rate of fuel gas returned from the other equipment 5, the composition, temperature, and flow rate of fuel gas at the outlet of the fuel supply equipment 2, and the flow rate of gas extracted to the other equipment 5.

In addition, in a case where it is possible to estimate a relationship associating the operation state or the like of the fuel supply equipment 2 and the other equipment 5 with the composition, temperature, and flow rate of fuel gas that is supplied from there and the flow rate of fuel that is extracted to the other equipment 5, it is possible to estimate the composition, temperature, flow rate, density, and calorific value of fuel gas that is supplied to the gas turbine 1, based on the operation state.

As a practical example to illustrate the present embodiment, for instance, suppose a case where the calorific value of fuel gas changes while the flow rate of fuel gas that is supplied to the fuel gas supply system (the upstream side of the pressure control valve 3) 7 for the gas turbine 1 remains constant, due to operation of equipment upstream of the fuel gas supply system 7, and a gross calorific value of fuel gas flowing into the gas turbine 1 has decreased.

In the case of controlling the load of the gas turbine 1 to remain constant, the flow rate of fuel gas to the gas turbine 1 is controlled to rise in order to maintain the calorific value of fuel gas that is supplied to the gas turbine 1.

In consequence, there is an increase in the flow rate of fuel gas that flows into the gas turbine 1 and is consumed. However, if the flow rate of fuel gas that is supplied to the upstream side of the pressure control valve 3 is constant as assumed above, the flow rate of fuel gas that is supplied to the fuel gas supply system (the upstream side of the pressure control valve 3) 7 of the gas turbine 1 becomes less than the flow rate of fuel gas that flows into the gas turbine 1 and is consumed.

Thereby, the pressure (P1 pressure) at the location A in FIG. 1 falls. Nevertheless, the fall of the P1 pressure can be restrained by decreasing the flow rate of fuel gas that flows into the gas turbine 1 and is consumed through the control by the present embodiment, as described previously.

It is also conceivable to prepare an initial target value of the P1 pressure that is determined from the flow rate, density, and calorific value of fuel gas in order to prevent the P1 pressure from falling or rising extremely and, when the P1 pressure deviates from the target value, control the P1 pressure to approximate the initial target value by increasing or decreasing the flow rate of fuel gas flowing into the gas turbine 1.

Note that the internal pressure of the fuel piping 8 of the fuel gas supply system 7 for the gas turbine 1 may be adjusted in another way. It is conceivable to allow fuel gas to always flow to the flare stack 6 to keep constant the internal pressure of the fuel piping 8 of the fuel gas supply system 7 for the gas turbine 1, dispose of fuel gas in the flare stack 6 to keep constant the pressure at the location A, and adjust the flow rate of fuel gas.

According to the present embodiment, stable operation of the gas turbine is enabled, avoiding a situation where the gas turbine fails to continue its operation due to a pressure drop or excessive pressure occurring in the upstream side of the fuel gas supply system 7.

Second Embodiment

Then, a second embodiment of the gas turbine 1 of the present invention is described.

In the present embodiment, in the procedural step 1 mentioned in the description of the first embodiment, control is implemented, capturing a tendency of change in the opening degree of the pressure control valve 3 instead of the P1 pressure.

Specifically, step 1 is to set the opening degree of the pressure control valve 3 in a state where it is automatically controlled, so that the P2 pressure reaches its target value. In this process, the opening degree of the pressure control valve 3 is automatically determined from the volumetric flow rate of fuel gas and the initial value of the P1 pressure.

Step 2: In a state where the P2 pressure is controlled to be maintained at a constant value as the result of step 1 above, when change occurs in the flow rate or calorific value of fuel gas supplied to the fuel gas supply system 7 for the gas turbine 1 due to operation of the other equipment 5 or the fuel gas supply equipment 2, resulting in a tendency of change in the opening degree of the pressure control valve 3 in order to control the P2 pressure to be constant, namely, when the opening degree of the pressure control valve 3 increases or decreases over time, adjust a command value of the flow rate of fuel gas to the gas turbine 1 so that no change occurs in the opening degree of the pressure control valve 3.

In particular, the command value of the fuel gas flow rate should be decreased if the opening degree of the pressure control valve 3 increases or increased if the opening degree of the pressure control valve 3 decreases.

The same effects as provided by the first embodiment can also be obtained in this way.

Third Embodiment

Then, a third embodiment of the gas turbine 1 of the present invention is described.

The present embodiment concerns a case where there are multiple fuel lines to the gas turbine combustor and multiple fuel gas supply systems for the gas turbine 1 in the foregoing first and second embodiments. In this case, as many flow control valves 4 as the fuel gas supply systems are provided at downstream of pressure control valves 3.

Even in the present embodiment thus configured, control can be implemented in the same way as in the first or second embodiment through the use of a total value of the flow rates of fuel gas flowing into the respective fuel gas supply systems 7 for a fuel gas flow rate.

Fourth Embodiment

Then, a fourth embodiment of the gas turbine 1 of the present invention is described.

Figure 5:
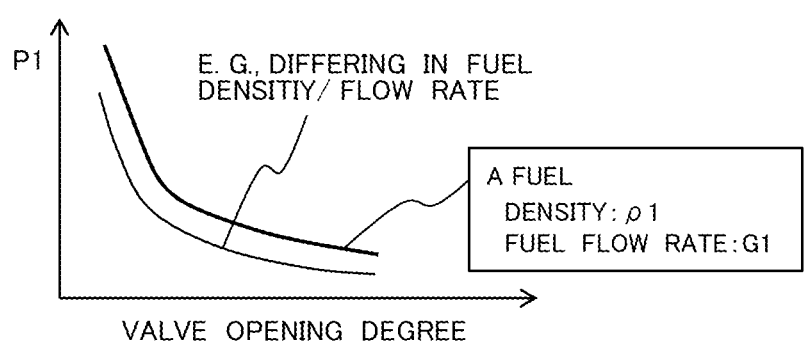
FIG. 5 is a diagram illustrating one example of a map in a fourth embodiment of the gas turbine of the present invention.

The present embodiment creates in advance a map of the opening degree of the pressure control valve 3 in relation to the density and flow rate of fuel gas and the P1 pressure in the first, second, or third embodiment (FIG. 5 is an example of the map).

For instance, a map of the opening degree of the pressure control valve 3 is created in advance through measuring and recording the flow rate and density of fuel gas with the opening degree of the pressure control valve 3 kept at a constant value. When a measured value of the fuel gas flow rate has become different from the fuel gas flow rate as a function of the opening degree of the pressure control valve 3 in the map created in advance, the map is modified and the initial target value of the P1 pressure is modified based on the modified map.

In other words, the flow rate and density of fuel gas with the P1 pressure and the opening degree of the pressure control valve 3 kept at a constant value are measured and recorded in a map. A function is added to modify the map when a measured value of the fuel gas flow rate has become different from the fuel gas flow rate as a function of the P1 pressure and the opening degree of the pressure control valve 3 in the map created in advance. The initial target value of the P1 pressure in the first embodiment should be modified based on the map modified by the map modifying function.

This enables it to keep the initial target values of the P1 pressure and the opening degree of the pressure control valve 3 within an appropriate range.

In addition, data is accumulated regarding a difference between the fuel gas flow rate with the P1 pressure and the opening degree of the pressure control valve 3 kept at a constant value and the fuel gas flow rate calculated from the map created in advance. A function is added to modify the map when a difference occurs between the fuel gas flow rate and the accumulated data. Initial setting values should be optimized according to the map modified by the map modifying function.

This enables it to optimize the initial setting values of the P1 pressure and the opening degree of the pressure control valve 3.

Note that the present invention is not limited to the embodiments described hereinbefore and various modifications are included therein. For example, the foregoing embodiments have been described in detail to explain the present invention clearly and the present invention is not necessarily limited to those including all components described. In addition, a subset of the components of an embodiment may be replaced by components of another embodiment, and components of another embodiment may be added to the components of an embodiment. In addition, for a subset of the components of each embodiment, other components may be added to the subset or the subset may be removed or replaced by other components.

REFERENCE SIGNS LIST

1 . . . gas turbine, 2 . . . fuel supply equipment, 3 . . . pressure control valve, 4 . . . flow control valve, 5 . . . other equipment, 5a . . . fuel gas extraction line to other equipment, 5b . . . fuel gas return line from other equipment, 6 . . . flare stack, 7 . . . fuel gas supply system, 8 . . . fuel piping, 10 . . . control system portion, 11 . . . gas turbine output command selector, 12 . . . output feedback controller, 13 . . . minimum value selector, 14 . . . function processor, 15 . . . unit that computes a gas turbine output command (third unit), 16 . . . amount of electricity generation as commanded by an electric power system or gas turbine load requirement, 17 . . . unit that computes a fuel command signal, also serving as a feedback controller, 18 . . . unit that computes an opening degree command for the pressure control valve, also serving as a feedback controller (second unit), 19 . . . unit that computes the density and calorific value of fuel gas flowing into the gas turbine (first unit), 20 . . . gas turbine output, C . . . compressor, F . . . combustor, T . . . turbine.

What is claimed is:

1. A gas turbine comprising:
   a fuel gas supply system configured to supply fuel gas from a fuel supply equipment via a fuel piping to a gas turbine combustor;
   a pressure control valve installed halfway along the fuel piping to control pressure of the fuel gas;
   a flow control valve installed in the fuel piping at a downstream side of the pressure control valve to control a flow rate of the fuel gas; and
   a control device configured that in a case where a flow rate change occurs in the fuel gas flowing through the fuel gas supply system, along with a change in an opening degree of the pressure control valve or a pressure P1 at an upstream side of the pressure control valve, a command value of the flow rate of the fuel gas that is determined based on a demand value of a gas turbine load is adjusted so that the change in the opening degree of the pressure control valve or the pressure P1 at the upstream side of the pressure control valve is suppressed.

2. The gas turbine according to claim 1,
   wherein a fuel gas extraction line to other equipment and a fuel gas return line from the other equipment are connected at a location upstream of the fuel gas supply system, and extraction and return of the fuel gas are performed via the fuel gas extraction line to the other equipment and the fuel gas return line from the other equipment at the location upstream of the fuel gas supply system.

3. The gas turbine according to claim 2,
   wherein the control device at least includes:
   a first unit that computes density and a calorific value of the fuel gas flowing into the gas turbine and is adapted to take input of at least temperature and a composition or density and a calorific value of the fuel gas measured in the vicinity of the pressure P1 at the upstream side of the pressure control valve, or the flow rate, temperature, and composition of the fuel gas flowing through the fuel piping before the fuel gas is extracted to the other equipment, the flow rate of the fuel gas flowing through the fuel gas extraction line to the other equipment, and a composition, temperature, and a flow rate of fuel gas flowing through the fuel gas return line from the other equipment and compute at least the calorific value and density of fuel gas flowing into the gas turbine;
   a second unit that computes an opening degree command for the pressure control valve, also serving as a feedback controller, and is adapted to take input of a pressure P2 at a downstream side of the pressure control valve and opening degree information of the pressure control valve, compute the opening degree command for the pressure control valve, output the opening degree command to the pressure control valve, and perform feedback control; and a third unit that computes a gas turbine output command and is adapted to take input of results of computing by the first unit, the pressure P1 at the upstream side of the pressure control valve, and opening degree information of the pressure control valve and the flow control valve and output a gas turbine output setting value, and the control device is adapted to select a minimum value from among a plurality of gas turbine output command values S1 to Sn including the gas turbine output setting value output from the third unit and determine an opening degree command for the flow control valve.

4. The gas turbine according to claim 3, wherein the control device is provided with a map of at least an opening degree of the pressure control valve that is created in advance, and the control device is configured to measure and record the flow rate of the fuel gas with the opening degree of the pressure control valve kept at a constant value, have a map modifying function to modify the map when a measured value of the flow rate of the fuel gas has become different from the flow rate of the fuel gas as a function of the opening degree of the pressure control valve in the map created in advance, and modify an initial target value of the pressure P1 based on the map modified by the map modifying function.

5. A method for adjusting a flow rate of fuel to a gas turbine, the gas turbine provided with a fuel gas supply system configured to supply fuel gas from a fuel supply equipment via a fuel piping to a gas turbine combustor, a pressure control valve installed halfway along the fuel piping to control pressure of the fuel gas, and a flow control valve installed in the fuel piping at a downstream side of the pressure control valve to control a flow rate of the fuel gas, wherein, for adjusting the flow rate of the fuel gas supplied to the gas turbine in a case where a flow rate change occurs in the fuel gas flowing through the fuel gas supply system, along with a change in an opening degree of the pressure control valve or a pressure P1 at an upstream side of the pressure control valve, the method adjusts a command value of the flow rate of the fuel gas that is determined based on a demand value of a gas turbine load so that the change in the opening degree of the pressure control valve or the pressure P1 at the upstream side of the pressure control valve is suppressed.

6. The method for adjusting the flow rate of fuel to the gas turbine according to claim 5, wherein the change in the pressure P1 at the upstream side of the pressure control valve results from change in at least the flow rate and/or calorific value of the fuel gas supplied to the fuel gas supply system in a state where the opening degree of the pressure control valve is automatically controlled so that a pressure P2 at a downstream side of the pressure control valve reaches a target value and the pressure P2 is controlled to be maintained at the target value.

7. The method for adjusting the flow rate of fuel to the gas turbine according to claim 6, wherein, when the pressure P1 increases or decreases over time along with the change in the at least the flow rate and/or the calorific value of the fuel gas supplied to the fuel gas supply system, the method adjusts the command value of the flow rate of the fuel gas so that the pressure P1 remains at an increased or decreased value based on the change in the at least the flow rate and/or the calorific value of the fuel gas supplied to the fuel gas supply system.

8. The method for adjusting the flow rate of fuel to the gas turbine according to claim 7, wherein the method decreases the command value of the flow rate of the fuel gas if the pressure P1 decreases or increases the command value of the flow rate of the fuel gas if the pressure P1 increases.

9. The method for adjusting the flow rate of fuel to the gas turbine according to claim 8, the method comprising the steps of:

creating a map of at least the P1 pressure in advance, measuring and recording the flow rate of the fuel gas with the pressure P1 kept at a constant value, modifying the map when a measured value of the flow rate of the fuel gas has become different from the flow rate of the fuel gas as a function of the pressure P1 in the map created in advance, and modifying an initial target value of the pressure P1 based on the map modified by the modifying step.

10. The method for adjusting the flow rate of fuel to the gas turbine according to claim 5, wherein the change in the opening degree of the pressure control valve results from change in at least the flow rate and/or calorific value of the fuel gas supplied to the fuel gas supply system in a state where the opening degree of the pressure control valve is automatically controlled so that a pressure P2 at a downstream side of the pressure control valve reaches a target value and the pressure P2 is controlled to be maintained at the target value.

11. The method for adjusting the flow rate of fuel to the gas turbine according to claim 10, wherein, when the opening degree of the pressure control valve increases or decreases over time along with change in at least the flow rate and/or the calorific value of the fuel gas supplied to the fuel gas supply system, the method adjusts the command value of the flow rate of the fuel gas so that the opening degree of the pressure control valve remains at an increased or decreased value based on the change in at least the flow rate and/or the calorific value of the fuel gas supplied to the fuel gas supply system.

12. The method for adjusting the flow rate of fuel to the gas turbine according to claim 11, wherein the method decreases the command value of the flow rate of the fuel gas if the opening degree of the pressure control valve increases or increases the command value of the flow rate of the fuel gas if the opening degree of the pressure control valve decreases.

13. The method for adjusting the flow rate of fuel to the gas turbine according to claim 12, the method comprising the steps of:

creating a map of at least the opening degree of the pressure control valve in advance, measuring and recording the flow rate of the fuel gas with the opening degree of the pressure control valve kept at a constant value, modifying the map when a measured value of the flow rate of the fuel gas has become different from the flow rate of the fuel gas as a function of the opening degree of the pressure control valve in the map created in advance, and modifying an initial target value of the pressure P1 based on the map modified by the modifying step.

14. The method for adjusting the flow rate of fuel to the gas turbine according to claim 5,
wherein the flow rate change in fuel gas flowing through the fuel gas supply system occurs with the fuel gas extracted to and/or returned from other equipment connected at a location upstream of the fuel gas supply system.

\* \* \* \* \*